United States Patent
Hinson

(10) Patent No.: US 9,864,568 B2
(45) Date of Patent: Jan. 9, 2018

(54) SOUND GENERATION FOR MONITORING USER INTERFACES

(71) Applicant: David Lee Hinson, Apex, NC (US)

(72) Inventor: David Lee Hinson, Apex, NC (US)

( * ) Notice: Subject to any disclaimer, the term of this patent is extended or adjusted under 35 U.S.C. 154(b) by 140 days.

(21) Appl. No.: 14/957,308

(22) Filed: Dec. 2, 2015

(65) Prior Publication Data

US 2017/0161010 A1    Jun. 8, 2017

(51) Int. Cl.
| | |
|---|---|
| *H04B 3/00* | (2006.01) |
| *G06F 3/16* | (2006.01) |
| *H04R 3/12* | (2006.01) |
| *G06F 3/03* | (2006.01) |
| *H03G 3/00* | (2006.01) |

(52) U.S. Cl.
CPC ............... *G06F 3/162* (2013.01); *G06F 3/03* (2013.01); *H04R 3/12* (2013.01)

(58) Field of Classification Search
CPC .............. G06F 3/162; G06F 3/03; H04R 3/12
USPC .......................................................... 381/77
See application file for complete search history.

(56) References Cited

U.S. PATENT DOCUMENTS

| | | | |
|---|---|---|---|
| 5,081,896 A | 1/1992 | Hiyoshi et al. | |
| 5,576,685 A | 11/1996 | Saito | |
| 5,912,976 A * | 6/1999 | Klayman | H04S 3/002 381/1 |
| 6,549,142 B2 | 4/2003 | Thomas et al. | |
| 7,714,700 B2 | 5/2010 | Morris | |
| 8,106,284 B2 | 1/2012 | Suzuki et al. | |
| 8,564,421 B2 | 10/2013 | Ferringo et al. | |
| 2006/0117261 A1 * | 6/2006 | Sim | G10H 1/0066 715/727 |
| 2010/0093435 A1 | 4/2010 | Glaser et al. | |
| 2012/0173008 A1 * | 7/2012 | Wang | G11B 20/10527 700/94 |
| 2012/0195166 A1 | 8/2012 | Rocha et al. | |

(Continued)

FOREIGN PATENT DOCUMENTS

| | | |
|---|---|---|
| CA | 2797151 A1 | 4/2014 |
| KR | 1020040022508 A | 3/2004 |

OTHER PUBLICATIONS

Malecia Bynum Modern Recording Techniques 7th edition Ch. 2 Sound and Hearing—Posted on Apr. 15, 2013.*

(Continued)

*Primary Examiner* — Vivian Chin
*Assistant Examiner* — Ammar Hamid
(74) *Attorney, Agent, or Firm* — Coats & Bennett, PLLC

(57) ABSTRACT

Methods, apparatus, computer program products embodied on non-transitory computer-readable storage mediums, and systems of sound generation for monitoring user interfaces include storing a mapping of visual elements of a user interface (UI) to respective coordinates in a virtual space, each of the respective coordinates having a corresponding distance within the virtual space from a virtual listener. For each mapped visual element in a first set of mapped visual elements, a respective sound component is generated based on a state of the mapped visual element within the UI, and the distance between the coordinates of the mapped visual element and the virtual listener. A plurality of the sound components is then transmitted to a remote device.

29 Claims, 11 Drawing Sheets

(56) References Cited

U.S. PATENT DOCUMENTS

2015/0055794 A1    2/2015  Sanchez et al.
2015/0256954 A1*  9/2015  Carlsson ............... H04R 27/00
                                                                 381/59

OTHER PUBLICATIONS global-mind.org. "Music from REG data. Using sound to detect structure in the data." The Global Consciousness Project: www.global-mind.org, Retrieved from the Internet on Nov. 19, 2015 <http://noosphere.princeton.edu/music.html>.

loopmasters.com. "Realistic Orchestral Panning—Instrument Placement in the Stereo Field." Retrieved from the Internet on Nov. 19, 2015 <http://www.loopmasters.com/articles/2361-Realistic-Orchestral-Panning-Instrument-Placement-In-The-Stereo-Field>.

UNITY3D. "Audio Listeners & Sources." Jul. 24, 2015, Retrieved from the Internet <https://unity3d.com/learn/tutorials/modules/beginner/audio/audio-sources-and-listeners?playlist=17096>.

Department of Defense. "Design Criteria Standard—Human Engineering MIL-STD-1472G." Retrieved from the Internet on Sep. 14, 2015 <http://everyspec.com/MIL-STD/MIL-STD-1400-1499/MIL-STD-1472G_39997/>.

Hermann, T. et al. (eds.) "The Sonification Handbook." COST Office and Logos Verlag Berlin GmbH, Sep. 2011, pp. 1-586.

Barra, M. et al. "WebMelody: Sonification of Web servers." pp. 1-5, Retrieved from the Internet on Sep. 16, 2015 <http://isis.dia.unisa.it/projects/SONIFICATION/Pubblications/shortsonif.html>.

Gilfix, M. et al. "Peep (The Network Auralizer): Monitoring Your Network With Sound." 2000 LISA XIV, Dec. 3-8, 2000, New Orleans, LA, pp. 109-118.

Author Unknown. "Peep (The Network Auralizer): Original project proposal." pp. 1-3, Retrieved from the Internet on Sep. 16, 2015 <http://peep.sourceforge.net/docs/peep-proposal.html>.

Hermann, T. et al. "Listen to your Data: Model-Based Sonification for Data Analysis." Int. Inst. for Advanced Studies in System research and cybernetics, 1999, pp. 1-6.

\* cited by examiner

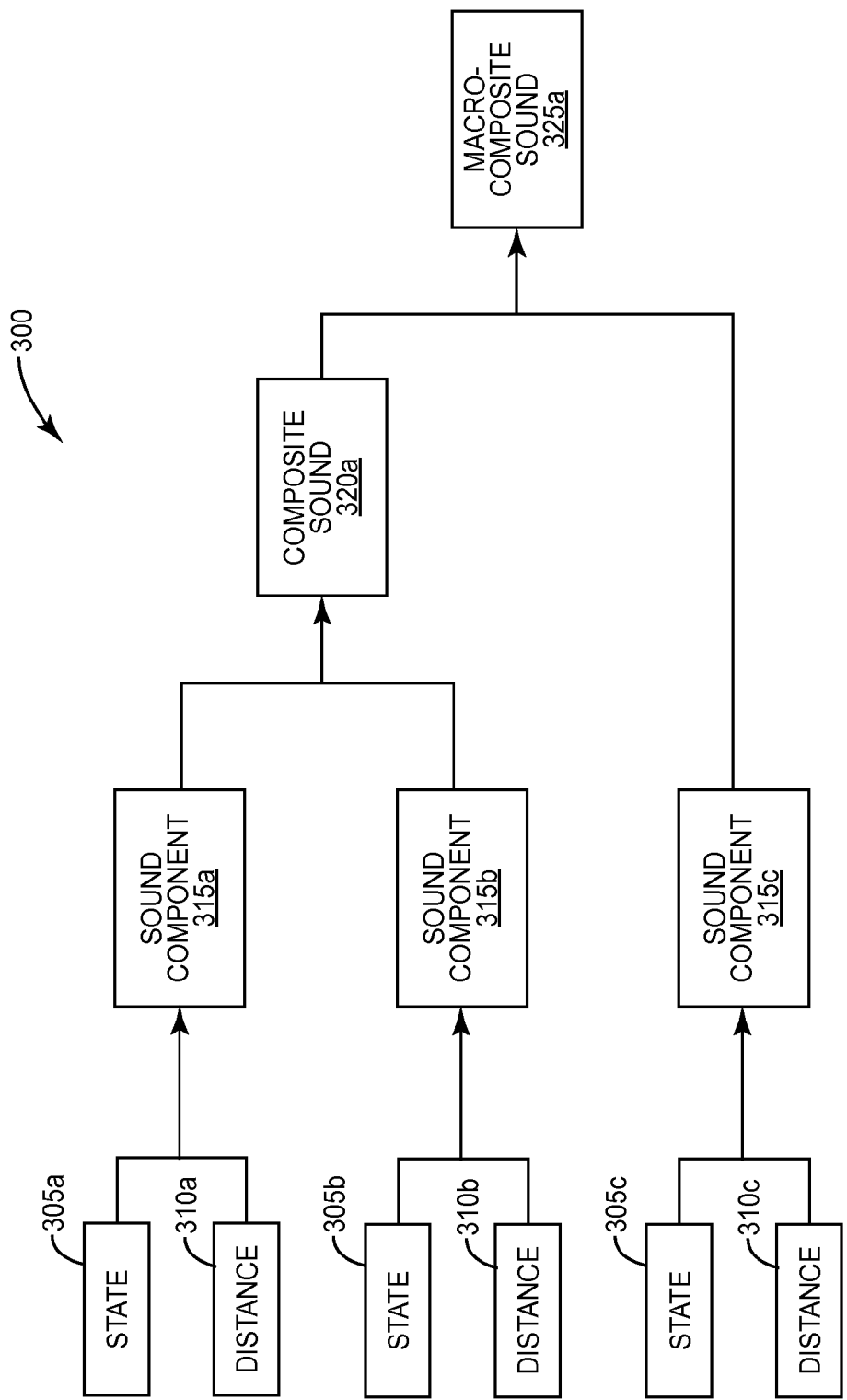

SOUND GENERATION FOR MONITORING USER INTERFACES

BACKGROUND

Modern software provides powerful tools for monitoring information. However, the volume of information that is available in many contexts can be overwhelming to a user. In an attempt to pace with the amount of information that is generally available to the user, user interfaces have become increasingly complex. To allow for bigger user interfaces that present more information to the user at once, monitors and screen resolutions have become increasingly large. However, it is impractical to expect a user to attentively monitor the vast amount of data that is conveyed by such increasingly large and complex user interfaces over any significant length of time. Accordingly, solutions that help a user to better monitor the information presented by modern user interfaces are desirable.

BRIEF SUMMARY

The present disclosure provides methods, apparatus, computer program products embodied on computer-readable storage mediums, and systems of sound generation for monitoring user interfaces. In an embodiment, a computer-implemented method comprises storing a mapping of visual elements of a user interface (UI) to respective coordinates in a virtual space, each of the respective coordinates having a corresponding distance within the virtual space from a virtual listener. The method further comprises, for each mapped visual element in a first set of mapped visual elements, generating a respective sound component based on a state of the mapped visual element within the UI, and the distance between the coordinates of the mapped visual element and the virtual listener. The method further comprises transmitting a plurality of the sound components to a remote device.

In another embodiment, a sound generation device comprises interface circuitry, memory circuitry, and processing circuitry. The memory circuitry is configured to store data. The interface circuity is configured to exchange signals over a network. The processing circuitry is communicatively coupled to the memory circuitry and interface circuitry. The processing circuitry is configured to store, in the memory circuitry, a mapping of visual elements of a user interface (UI) to respective coordinates in a virtual space, each of the respective coordinates having a corresponding distance within the virtual space from a virtual listener. The processing circuitry is further configured to, for each mapped visual element in a first set of mapped visual elements, generate a respective sound component based on a state of the mapped visual element within the UI, and the distance between the coordinates of the mapped visual element and the virtual listener. The processing circuitry is further configured to transmit a plurality of the sound components to a remote device via the interface circuitry.

In a further embodiment, a non-transitory medium stores software instructions that, when executed by processing circuitry of a programmable sound generation device, cause the programmable sound generation device to store a mapping of visual elements of a user interface (UI) to respective coordinates in a virtual space, each of the respective coordinates having a corresponding distance within the virtual space from a virtual listener. The software instructions further cause the programmable sound generation device to, for each mapped visual element in a first set of mapped visual elements, generate a respective sound component based on a state of the mapped visual element within the UI, and the distance between the coordinates of the mapped visual element and the virtual listener. The software instructions further cause the programmable sound generation device to transmit a plurality of the sound components to a remote device via the interface circuitry.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 3 is a block diagram illustrating stages of sound generation from components, according to various embodiments of the present disclosure.

DETAILED DESCRIPTION

Figure 1:
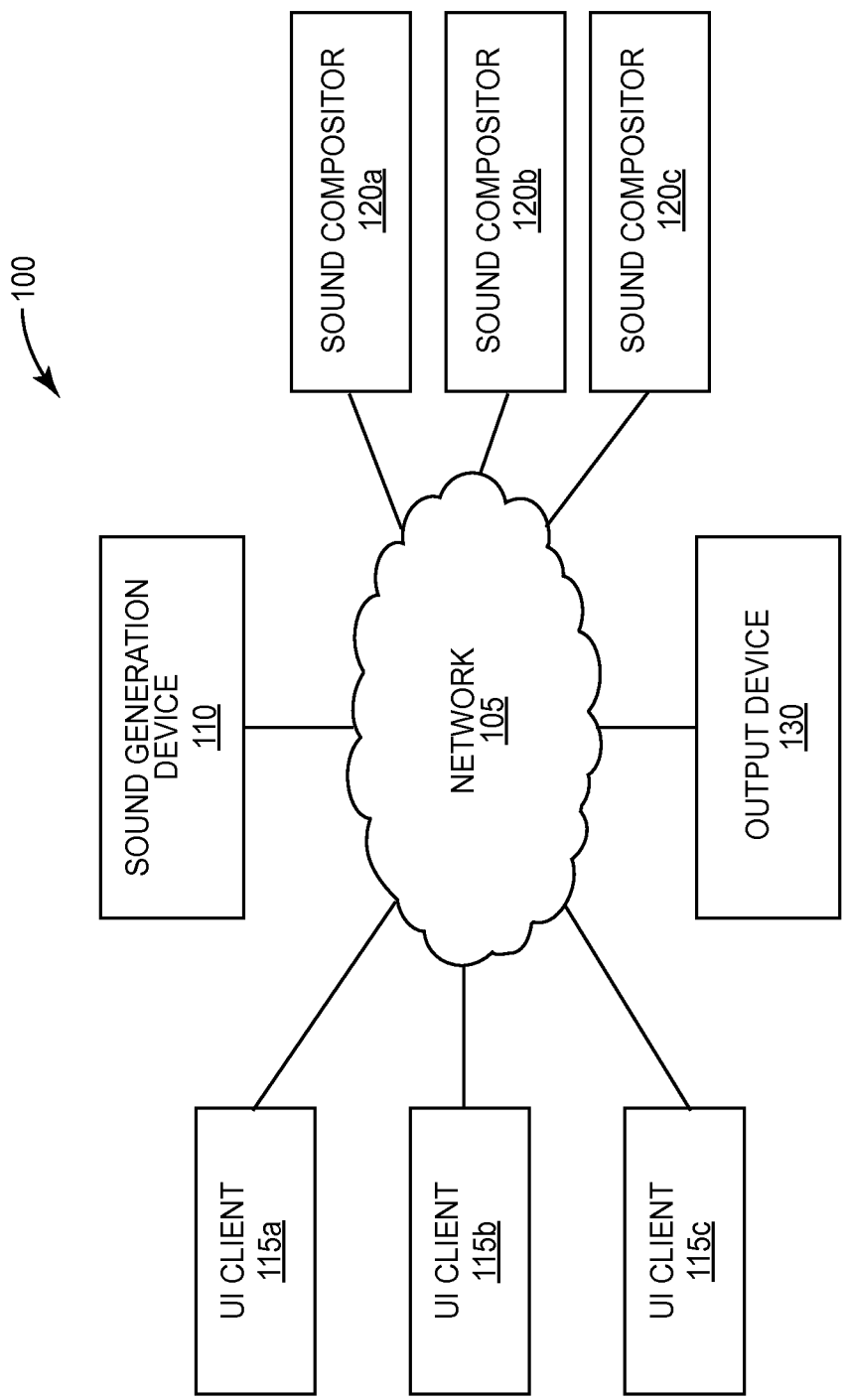
FIG. 1 is a block diagram illustrating an example system according to various embodiments of the present disclosure.

The present disclosure generally relates to computer-implemented sound generation for monitoring user interfaces (UIs). An example system 100 supporting such sound generation is illustrated in FIG. 1. The example system 100 comprises a network 105, a sound generation device 110, UI clients 115a-c, sound compositors 120a-c, and an output device 130. In general, use of a reference numeral should be regarded as referring to the depicted subject matter generally, whereas discussion of a specific instance of an illustrated element will append a letter designation thereto (e.g., discussion of a UI client 115 generally, as opposed to discussion of the particular UI clients 115a, 115b, 115c).

A UI client 115 may be any computing device capable of providing a UI to a user and exchanging signals with the network 105 to communicate with the sound generation device 110. In particular, a UI client 115 may provide a UI that is of particular interest to, and monitored attentively by, a user. Examples of a UI client 115 include a personal computer, a laptop computer, a desktop computer, a workstation, a smartphone, a tablet computer, a wearable computer, a server, a server cluster, and a smart appliance.

The network 105 may be any communications network capable of carrying signals between the UI clients 115a-c, the sound generation device 110, the sound compositors 120a-c, and/or the output device 130. Examples of the network 105 include (but are not limited to) one or more of the Internet, one or more local area networks, one or more wireless networks, one or more cellular networks, one or more Internet Protocol-based networks, one or more Ethernet networks, one or more optical networks, and one or more circuit-switched networks.

The sound generation device 110 may be any computing device capable of exchanging signals with the network 105 in order to communicate with the UI clients 115a-c, the sound compositors 120a-c, and/or the output device 130. In particular, the sound generation device 110 may generate sound components for a UI produced by one or more of the UI clients 115a-c, and provide the generated sound components to one or more consumers (e.g., one or more of the UI clients 115a-c, the sound compositors 120a-c, and/or the output device 130) so that a user may listen to an audible representation of that UI. Examples of a sound generation device 110 include a personal computer, a laptop computer, a desktop computer, a workstation, a smartphone, a tablet computer, a wearable computer, a server, a server cluster, and a smart appliance.

A sound compositor 120 may be any computing device capable of exchanging signals with the network 105 to communicate with the sound generation device 110 and processing received sound components into one or more composite sounds. In particular, the sound compositor 120 may generate composite sounds from sound components produced by the sound generation device 110, and transmit the generated composite sounds to one or more of the UI clients 115a-c and/or the output device 130. Examples of a sound compositor 120 include a personal computer, a laptop computer, a desktop computer, a workstation, a smartphone, a tablet computer, a wearable computer, a server, a server cluster, a smart appliance, a network-enabled audio receiver, and a mixer.

The output device 130 may be any computing device capable of producing audio output to a user based on signals received via the network 105, e.g., from the sound generation device 110 and/or a sound compositor 120. Examples of an output device 130 include a personal computer, a laptop computer, a desktop computer, a workstation, a smartphone, a tablet computer, a wearable computer, a server, a server cluster, a smart appliance, a radio, a home theater, and a speaker.

Although FIG. 1 illustrates three UI clients 115a-c, three sound compositors 120a-c, and one output device 130, other embodiments of the system 100 may include fewer or additional UI clients 115, sound compositors 120, and/or output devices 130. Further, each of the devices 110, 115a-c, 120a-c, 130 may act as any other of the devices 110, 115a-c, 120a-c, 130, according to various embodiments.

Figure 2A:
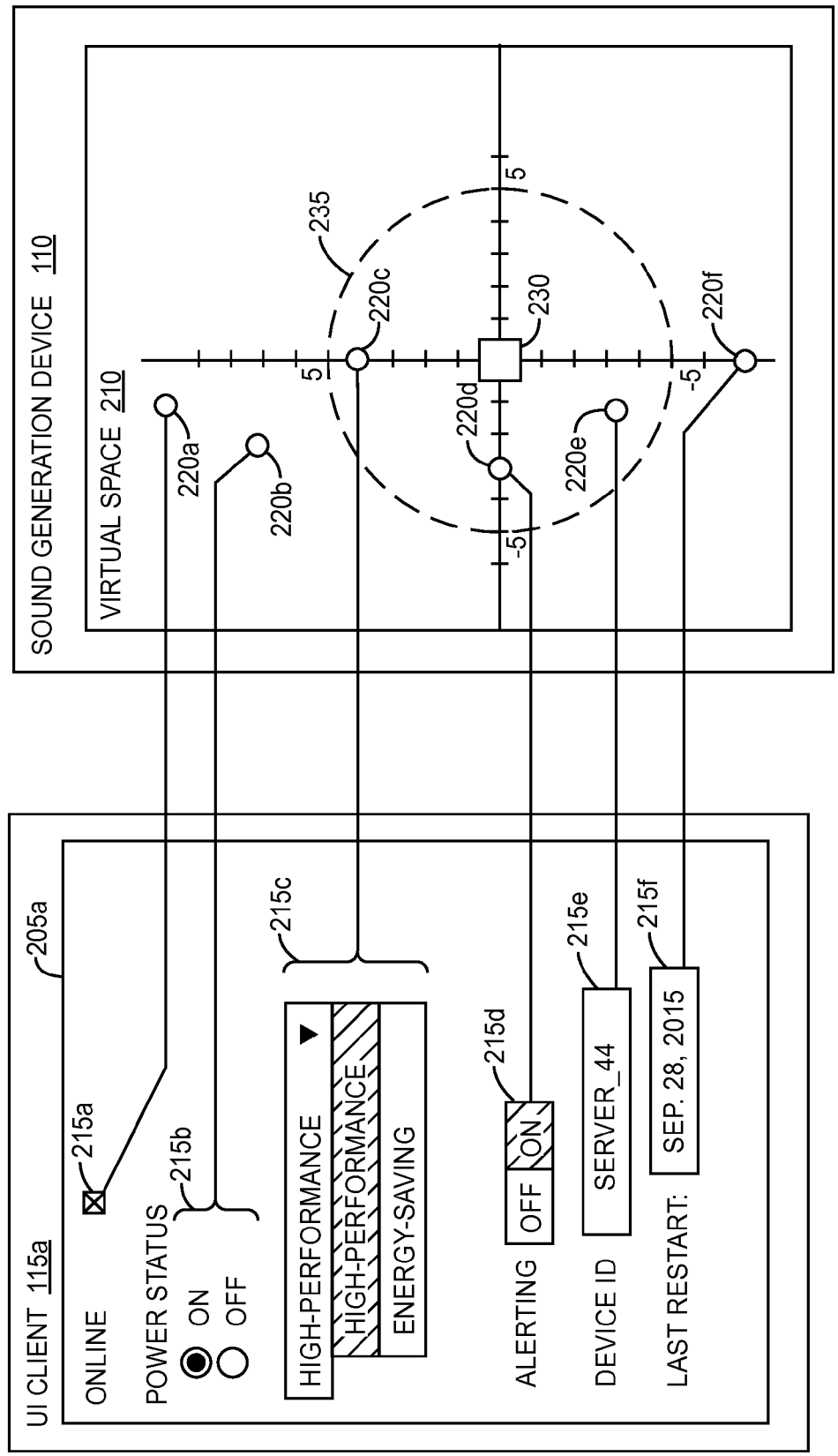
FIG. 2A illustrates an example of mapping visual elements of a user interface to respective coordinates in a virtual space, according to various embodiments of the present disclosure.

As shown in FIG. 2A, a UI client 115a is configured to provide a UI 205a comprising visual elements 215a-f to a user. The visual elements 215a-f of UI client 115a are mapped to respective coordinates 220a-f in a virtual space 210 maintained by the sound generation device 110.

This particular example UI 205a of FIG. 2A depicts visual elements 215a-f that are useful for managing the configuration of a computer. In particular, the UI 205a comprises a checkbox 215a, a radio button group 215b, a pull-down menu 215c, a toggle button 215d, a text field 215e, and a date field 215f. Checkbox 215a is configurable according to either a "checked" or "not checked" state that reflects the network connectivity of the managed computer. Radio button group 215b is configurable according to an "On" or "Off" state that reflects the power status of the managed computer. Pull-down menu 215c is configurable according to a "High-Performance" or "Energy-Saving" state that reflects the performance setting of the managed computer. Toggle button 215d is configurable according to an "On" or "Off" state that reflects whether alerts are enabled for the managed computer. Text field 215e is configurable according to a string of characters that may be predefined or specified by the user, and reflects a device identifier for the managed computer. Date field 215f is configurable according to a date reported by the remote computer, and reflects the last time that the remote computer was restarted.

The UI client 115a informs the sound generation device 110 of the visual elements 215a-f, and the sound generation device 110 maps the visual elements 215a-f to respective coordinates 220a-f in the virtual space 210. The particular mapping between visual elements 215a-f and coordinates 220a-f may be assigned programmatically by the sound generation device 110, may be manually designated by a user, or may be configured according to a command from a remote device, e.g., UI client 115, sound compositor 120, output device 130. For example, the sound generation device 110 may allow a user to individually specify which of the visual elements 215a-f should be mapped to the virtual space 210, and to which particular coordinates 220a-f. For another example, the sound generation device 110 may allow a user to select a predefined arrangement of coordinates (e.g., a ring pattern, a star pattern) for one or more of the visual elements 215a-f.

The virtual space 210 also comprises a virtual listener 230 that may be positioned within the coordinate system of the virtual space 210 according to user preferences, or at predefined coordinates (e.g., an origin of the coordinate system, as illustrated in FIG. 2A). In this example, the visual elements 215a-f are each mapped to respective coordinates 220a-f that have a distance in the virtual space 210 from the virtual listener 230.

The sound generation device 110 generates sound information for a mapped visual element 215 based on the state of the mapped visual element 215, as well as the distance between the coordinates 220 of the mapped visual element 215 and the virtual listener 230. The sound generation device 110 may generate respective sound components for each mapped visual element 215, or for only a subset of the mapped visual elements 215, according to particular embodiments. These sound components may subsequently be integrated into a composite sound to convey audible information to the user as an alternative, or supplement, to a UI 205. The generation of composite sounds will be discussed in greater detail below.

In an example of generating sound components for visual elements 215, the sound generation device 110 bases the amplitude of the generated sound component on the distance between the coordinates 220 mapped to visual element 215 and the virtual listener 230. Specifically, for each unit of distance away from the virtual listener 230, the amplitude is reduced by 20% from a given maximum amplitude. Thus, if the visual element 215 is at a threshold distance 235 of five units or farther from the virtual listener 230, either no sound or silence is generated for the visual element 215. Accordingly, the sound generation device 110 may identify a set of mapped visual elements 215 for which to generate sound components by selecting visual elements 215 that are mapped to coordinates 220 within the threshold distance 235.

Applying the above amplitude example to visual element 215c, the sound generation device 110 uses a distance of four units because visual element 215c is mapped to coordinates (0, 4) in the virtual space 210, whereas the virtual listener 230 is positioned at the origin (0, 0) of the virtual space 210. Thus, the sound component generated for visual element 215c will have an amplitude that is 80% less than the given maximum (because −20% times four is −80%). When applied to visual element 215e, which has a distance at (or very close to) four units, a sound component will be generated that has the same (or similar) amplitude. However, visual element 215d is mapped to coordinates 220d at (3,0) at a distance of only three units. Therefore, a sound component generated for visual element 215d will be louder than the sound generated for visual elements 215c, 215e (i.e., a sound component generated for visual element 215d will have an amplitude at only a 60% reduction from maximum). Further, the sound generation device 110 will generate silence for visual elements 215a, 215b, 215f because they are beyond the threshold distance 235.

In this way, mapping visual elements 215 to the virtual space 210 may be significant in balancing the relative amplitudes of the generated sound components that will later be integrated into a composite sound. In particular, placement closer to the virtual listener 230 may be desirable for visual elements 215 that are more important to the user, as they will correspond to higher amplitude sound components of the composite sound. Thus, should a visual element 215 that is close to the virtual listener 230 change state within the UI 205, a corresponding change to a sound component will be quite perceptible to the user, even when that sound component is integrated into a sound composite, because of that sound component's relatively high amplitude. Indeed, the sound generation device 110 may detect a modification to a state of a mapped visual element 215 in the UI 205, and generate sound components in response. In addition, the threshold distance 235 may be useful to limit the number of sound components that are generated, thereby preventing an overly noisy or complex composite sound from being generated.

Other embodiments may use the distance from the virtual listener 230 to determine appropriate amplitude for a sound component by modeling the relationship between amplitude and distance differently, for example. In one such example, amplitude is reduced by a certain number of decibels each time the distance from the virtual listener 230 is doubled, thereby decreasing amplitude logarithmically as distance increases (as opposed to linearly as described above). Other embodiments may, instead, increase amplitude as distance increases up to a maximum amplitude applied at the distance threshold 235. Yet other embodiments may apply amplitude such that a graph of the amplitude changes parabolically over distance. Thus, the relationship between amplitude and distance in generating sound components may, in certain embodiments, be quite complex. Accordingly, the sound generation device 110 may provide an interface by which a user and/or remote device may specify this relationship, e.g., by providing an appropriate formula or set of representative data points from which an appropriate formula may be derived.

The above is an example of how distance may be used by the sound generation device 110 to generate sound components for visual elements 215 of a UI 205. However, the state of the visual elements 215 is also used in generating sound components. For example, the state of the visual element may influence a duration of the generated sound.

In this particular example, the visual element 215c is in a high-performance state that is associated with a relatively short duration (e.g., resulting in a short blip during playback). This is in contrast to the energy-saving state, which is associated with a relatively longer duration (e.g., resulting in a relatively more sustained tone). Thus, shorter sounds may connote to a user states that are active, on, recent, and the like, whereas longer sounds may connote to the listener states that are passive, off, distant, and so on.

Particular sound attributes may be associated differently according to the states available to particular visual elements 215 and/or in order to convey different audible themes as may be important to a user tasked with monitoring a particular UI 205. Applying this example to the other visual elements 215d, 215e of UI 205a mapped within the distance threshold 235, the sound component generated for visual element 215d may also be of a short duration, because the state of visual element 215d is "On." However, the sound component generated for visual element 215e may be of a long duration, because the state of visual element 215e is "Server_44," which implies that there are forty-three lower numbered servers in the datacenter and this server is far from being first. In other words, if the state were instead "Server_20," the sound component generated for visual element 215e might of shorter duration, whereas if the state were "Server_1," the generated sound component might be shorter still. Other associations of sound attributes with visual element 215 states are possible, according to other embodiments.

The various UI clients 115a-c of the system 100 may provide functions that are not necessarily related. For example, the UIs of other UI clients 115 may be useful for other tasks, e.g., monitoring the stock market and/or monitoring power load levels across a power grid. Such other UIs 205 may be mapped to the same virtual space 210, or to respective virtual spaces 210, according to various embodiments.

Figure 2B:
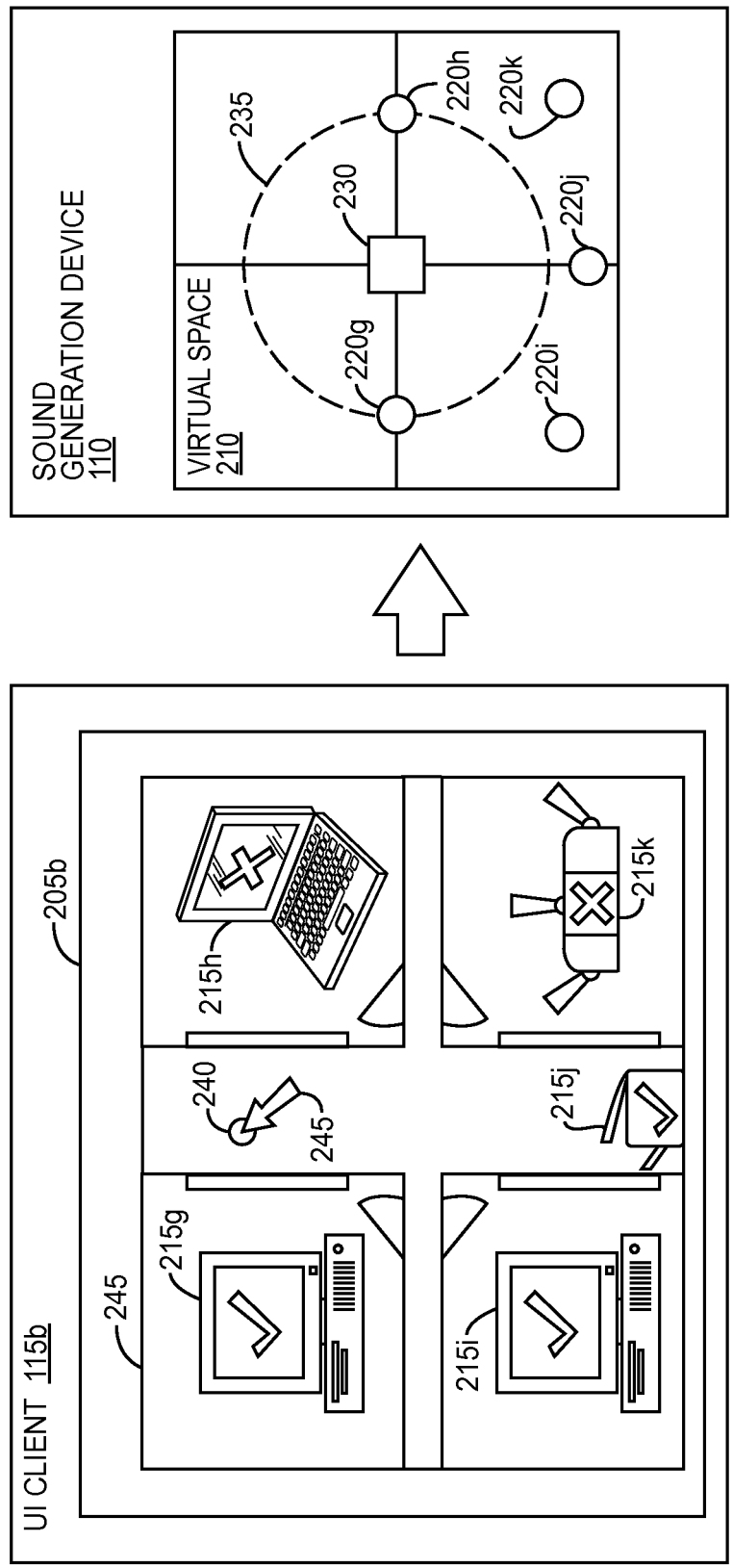
FIG. 2B illustrates an example of generating a mapping visual elements of a user interface to respective coordinates in a virtual space according to user input, according to various embodiments of the present disclosure.

For example, the UI illustrated in FIG. 2B is useful for monitoring network-attached hardware devices in an office setting. As illustrated in FIG. 2B, UI client 115b provides a UI 205b depicting an office floorplan 245 in which the office's network devices are represented by visual elements 215g-k. Visual element 215g represents a desktop computer in the north-west corner of the office. Visual element 215h represents a laptop computer in the north-east corner of the office. Visual element 215i represents a desktop computer in the south-west corner of the office. Visual element 215j represents a photocopier in the south of the office. Visual element 215k represents a wireless router in the south-east corner of the office. The visual elements are icons having a shape that visually depicts the type of device they respectively represent, and having either a check or X-mark respectively indicating whether the corresponding device is experiencing dropped packets. The visual elements 215g-k are mapped to coordinates 220g-k in the virtual space 210 of the sound generation device 110.

The manner in which visual elements 215 are mapped to the virtual space may vary, according to particular embodiments. For example, the mapping illustrated in FIG. 2A may have been performed by a user that individually designates coordinates 220a-f for respective visual elements 215a-f. In the example of FIG. 2B, the mapping of the visual elements 215g-k to coordinates 220g-k is based on input from a user designating a position 240 within the UI 205b that will correspond to a position of the virtual listener 230 in the virtual space 210.

Specifically, a user of UI 205b moves mouse cursor 245 to position 240 and clicks that position 240 to designate it as the user-desired location for the virtual listener 230. The UI client 115b sends the positions of the visual elements 215g-k and the user-designated position 240 to the sound generation device 110. The sound generation device 110 then uses the user-designated position 240 as a reference point for the virtual listener 230 and maps the visual elements 215g-k to coordinates 220g-k relative to the virtual listener 230 according to their respective positions relative to the user-designated position 240, and to each other, in UI 205b. Thus, as shown in FIG. 2B, just as visual element 215g is due west of the user-designated position 240 in UI 205b, corresponding coordinate 220g is on the x-axis to the left of virtual listener 230. Similarly, just as visual elements 215i, 215j, 215k, and 215h are to the south-west, south, south-east, and east of the user-designated position 240 in the UI 205b, corresponding coordinates 220i, 220j, 220k, and 220h are to the bottom-left, bottom, bottom-right, and right of the virtual listener 230 in the virtual space 210.

Other UIs 205 are possible, and may similarly be compatible with the various embodiments of the present disclosure. In addition, other types of visual elements 215 are possible, such as status lights that may illuminate according to different colors to reflect different status information (e.g., green for normal, yellow for warning, red for danger), or icons that change their appearance to convey different information (e.g., icons that depict respective modes of operation of an associated computer or machine). Further, the presence of a particular visual element 215 in the UI 205 may be a state (i.e., a state of existence) that is important for a user to maintain awareness of, may therefore be mapped to the virtual space 210 of the sound generation device 110 (e.g., the presence of an error log entry in the UI 205, as opposed to the absence of error log entries in the UI 205).

Further, although the virtual space 210 illustrated in FIGS. 2A and 2B is two-dimensional, other embodiments of the present disclosure may use a coordinate system using a different number of dimensions. The positioning of one or more of the elements in the virtual space 210, such as the positioning of coordinates 220 to which visual elements 215 are mapped, the positioning of the virtual listener 230, and the positioning of the distance threshold 235, may be initially configured and/or subsequently modified by one or more commands received from a remote device and/or a user.

For example, the UI client 115b may update the sound generation device 110 with position data of the visual elements 215g-k and/or the user-designated position 240 in response to the visual elements 215g-k and/or the user-designated position 240 being moved or removed from UI 205b. The UI client 115b may additionally or alternatively update the sound generation device 110 with position data in response to a new visual element 215 being added to the UI 205b. In response to receiving updated UI position data, the sound generation device 110 may reposition respective coordinates 220 and/or the virtual listener 230 within the virtual space 210 accordingly.

The sound generation device 110 may additionally or alternatively provide its own UI that graphically depicts the virtual space 210 and allows a user to reposition the coordinates 220 and/or virtual listener 230 therein. For example, the sound generation device 110 may graphically depict the coordinates 220, virtual listener 230, and distance threshold 235 as objects within the UI representing the virtual space 210 that the user manipulates using an appropriate input device. Thus, a user may use a mouse to drag-and-drop the objects of the virtual space 210 UI in order to reposition the coordinates 220, virtual listener 230, and/or distance threshold 235 as desired. Other manipulations of the virtual space 210 are possible, according to other embodiments.

As previously mentioned, the sound components generated based on the states and distances of respective visual elements 215 may be integrated to generate a composite sound. Such a composite sound may be useful for contemporaneously conveying information about a set of visual elements 215. For example, when all of the visual elements 215 corresponding to a composite sound are at nominal levels, then the composite sound may be in phase, harmonious, and/or concordant. However, if any of the visual elements 215 of the composite sound reflect an incompatible, erroneous, and/or out-of-tolerance state, the composite sound may be out of phase, disharmonious, and/or discordant, such that a user who hears such a composite sound played would quickly recognize that there is a problem indicated in the UI 205.

For example, if desktop computer icon 215g is in the "checked" state (indicating that the desktop computer is not experiencing dropped packets), the sound generation device 110 may produce a pure middle C note as a sound component. However, if the laptop computer icon 215h is in the "x-marked" state (indicating the laptop computer is experiencing dropped packets), the sound generation device 110 may produce a note that is less than a half-tone flatter than pure middle C as a sound component. Accordingly, by integrating the pure and flat sound components, the sound generation device 110 may produce a composite sound that is generally unpleasant to listen to, thereby drawing a user's attention to the UI 205b, and motivating the user to quickly remedy the problem with the managed computer reflected therein.

Composite sounds may be also be integrated with one or more other composite sounds and/or sound components to generate macro-composite sounds. FIG. 3 illustrates an example workflow 300 of the sound generation device 110 in which the respective states 305a-c and distances 310a-c of the three visual elements 215c-e of FIG. 2A described above may be used as a basis for the generation of corresponding sound components 315a-c, a composite sound 320a, and a macro-composite sound 325a.

In the example workflow 300, state 305a and distance 310a correspond to visual element 215c; state 305b and distance 310b correspond to visual element 215d; and state 305c and distance 310c correspond to visual element 215e. The sound generation device 110 generates sound component 315a based on the state 305a and distance 310a corresponding to visual element 215c. Similarly, the sound generation device 110 generates sound component 315b based on the state 305b and distance 310b corresponding to visual element 215d. Further, the sound generation device 110 generates sound component 315c based on the state 305c and distance 310c corresponding to visual element 215e. Thus, for each mapped visual element in the set of mapped visual elements that are within the threshold distance 235, the sound generation device 110 generates respective sound components based on the state 305 of the mapped visual element 215 and the distance 310 between the coordinates 220 of the mapped visual element 215 and the virtual listener 230.

Sound components 315a, 315b are then integrated (as will be described in greater detail below) to generate a composite sound 320a. The composite sound 320a is then integrated with sound component 315c to generate a macro-composite sound 325a.

Workflow 300 is just one example of how the states 305a-c and distances 310a-c between coordinates of the mapped visual elements 220a-c may be used to generate sound components 315, composite sounds 320, and macro-composite sounds 325. Other examples may include integrating more than two sound components 315 to generate a composite sound 320, integrating multiple composite sounds 320 to generate a macro-composite sound 325, and/or integrating a macro-composite sound 325 with one or more sound components 315 and/or composite sounds 320. Further, the sound generation device 110 may transmit sound components 315 to remote sound compositors 120 to generate one or more composite sounds 320. In particular, transmitting a plurality of sound components 315 to, for example, sound compositor 120a may result in production of a different composite sound than that produced by sending those same sound components 315 to sound compositor 120b. Thus, various sound compositors may be configured to integrate received sound components 315 in different ways, for example, in order to meet the needs and/or preferences of their respective user(s).

Figure 4:
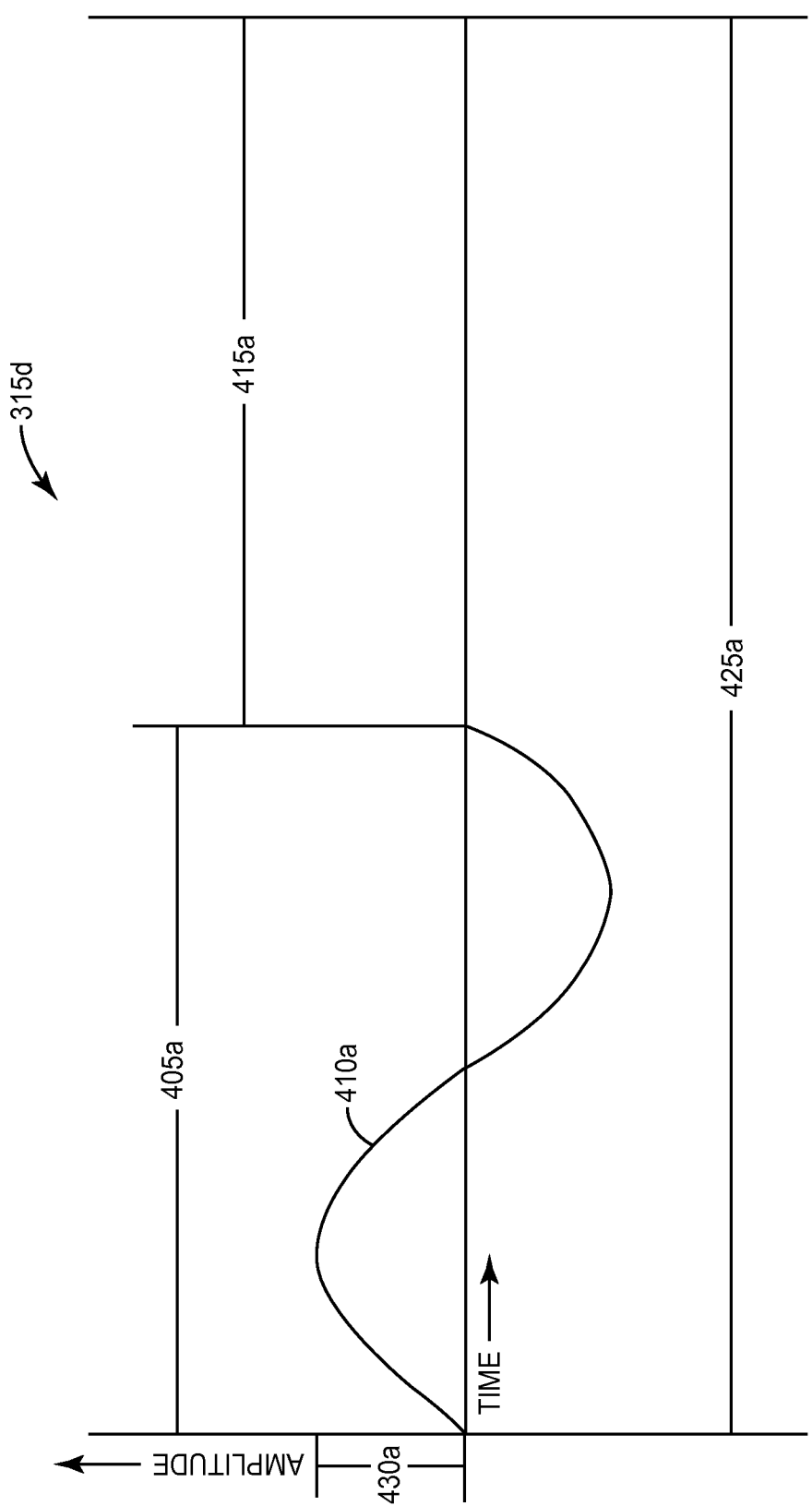
FIG. 4 illustrates an example sound component, according to various embodiments of the present disclosure.

An example sound component 315d is illustrated in FIG. 4. Sound component 315d is depicted on a graph in which the x-axis represents time, and the y-axis represents amplitude. The sound component 315d comprises a silence duration 415a and a waveform shape 410a having an amplitude 430a and a waveform duration 405a. The waveform duration 405a is immediately succeeded by the silence duration 415a. The waveform duration 405a and silence duration 415a, taken together, form a repeat interval 425a. Thus, when sound component 315d is rendered by, e.g., output device 130, the waveform shape 410a will be output over waveform duration 405a, but will not be output during silence duration 415a. However, after the repeat duration 425a has expired, output of the sound component 315d may repeat, starting by outputting the waveform shape 410a over a subsequent waveform duration 405a, and a subsequent silence duration 415a, for example.

Figure 5A:
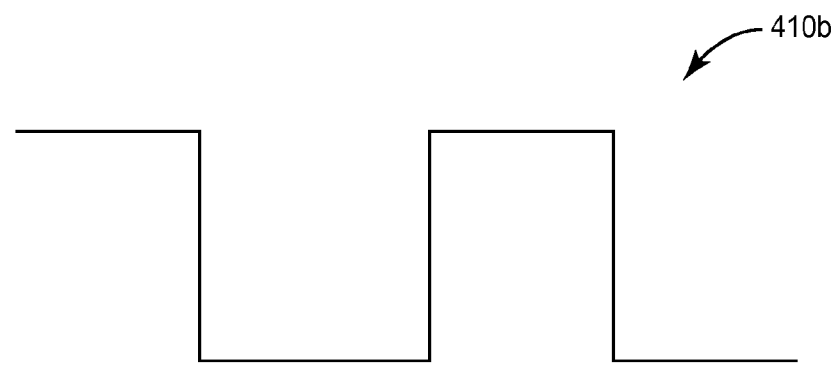
FIGS. 5A-C illustrate example waveform shapes, according to various embodiments of the present disclosure.
Figure 5B:
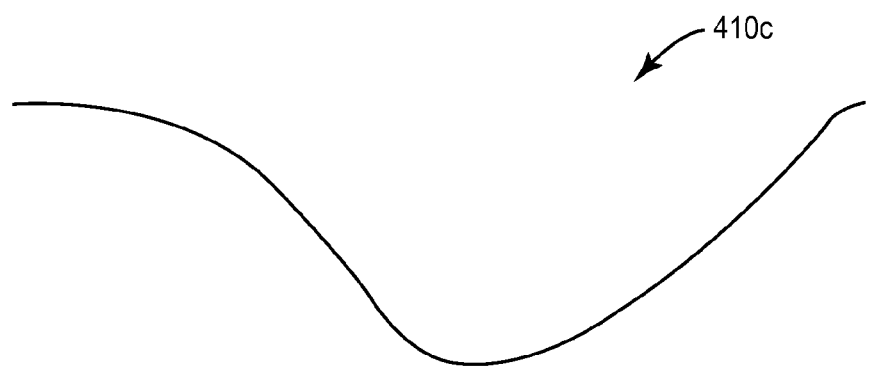
Figure 5C:

The waveform shape 410a of sound component 315d is that of a simple sine wave. However, other sound components 315 may have different waveform shapes 410. FIG. 5A illustrates an example of a square wave waveform shape 410b. FIG. 5B illustrates an example of a cosign wave waveform shape 410c. Although waveform shapes 410a, 410b, 410c are quite simple, sound components 315 with more complex waveform shapes 410 may also be generated by the sound generation device 110. FIG. 5C illustrates an example of a complex waveform shape 410d.

Figure 6:
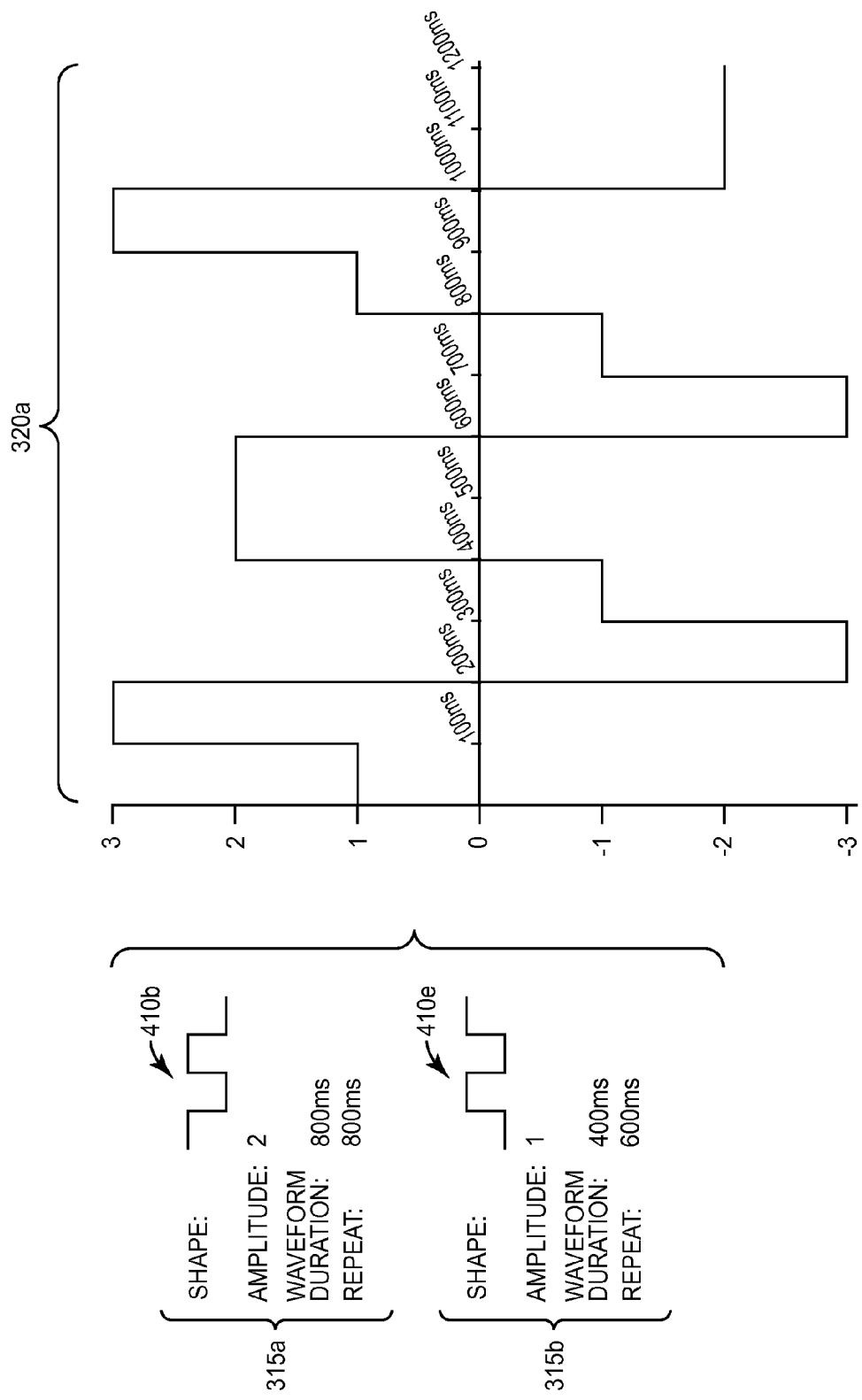
FIG. 6 illustrates integrating sound components to generate a composite sound, according to various embodiments of the present disclosure.

An example of integrating sound components 315a, 315b to generate a 1200 ms composite sound 320a is illustrated in FIG. 6. In this example, sound component 315a has the square wave waveform shape 410b, an amplitude 430b of 2, a waveform duration 405b of 800 ms, and a repeat interval 425b of 800 ms. Because the repeat interval 425b and waveform duration 405b of sound component 315a are the same length of time, sound component 315a has a silence duration 415b of zero. Accordingly, sound component 315a produces, for the first twelve 100 ms intervals, the values: +2, +2, −2, −2, +2, +2, −2, −2, +2, +2, −2, −2.

Sound component 315b has a square wave waveform shape 410e, an amplitude 430c of 1, a waveform duration 405c of 400 ms, and a repeat interval 425c of 600 ms. Thus, sound component 315b has a silence duration 415c of 200 ms (which is the amount of time remaining after the 400 ms waveform duration 405c). Accordingly, sound component 315b produces, for the first twelve 100 ms intervals, the values: −1, +1, −1, +1, 0, 0, −1, +1, −1, +1, 0, 0.

Integrating sound components 315a, 315b according to the example illustrated in FIG. 6 simply involves combining values produced by the sound components 315a, 315b, starting from time zero. As depicted in FIG. 6, a 1200 ms composite sound 320a generated by integrating sound components 315a, 315b in this way produces, for the twelve 100 ms intervals within a 1200 ms span, the values: +1, +3, −3, −1, +2, +2, −3, −1, +1, +3, −2, −2.

The sound components 315 may be integrated in other ways, according to various embodiments of the present disclosure. For example, a particular integration scheme may include taking the negation, boosting, reducing, and/or normalizing amplitude, and/or time-shifting of one or more of the sound components 315. Other schemes for integrating sound components 315 may also be used. Further, generating macro-composite sounds 325 may similarly integrate a composite sound 320 with one or more other composite sounds 320 and/or one or more sound components 315.

The above illustrates one example in which mapping visual elements 215 to respective coordinates 220 in a virtual space 210 may be used to generate sound components 315, composite sounds 320, and macro-composite sounds 325. However, as shown in the example of FIG. 2A, there may be visual elements 215 that are mapped outside of the threshold distance 235 from the virtual listener 230, though the states of those visual elements 215 may also be important to audibly convey to a user. In order to, for example, ensure that information these other visual elements 215 is audibly conveyed to the user, the distance between the coordinates 220 of at least one mapped visual element 215 and the virtual listener 230 may be modified, and in response, for each mapped visual element 215 in a second set of mapped visual elements 215, the sound generation device 110 may generate a respective subsequent sound component 315 based on the mapped visual element states 305 and distances 310, similar to the discussion above.

Figure 7:
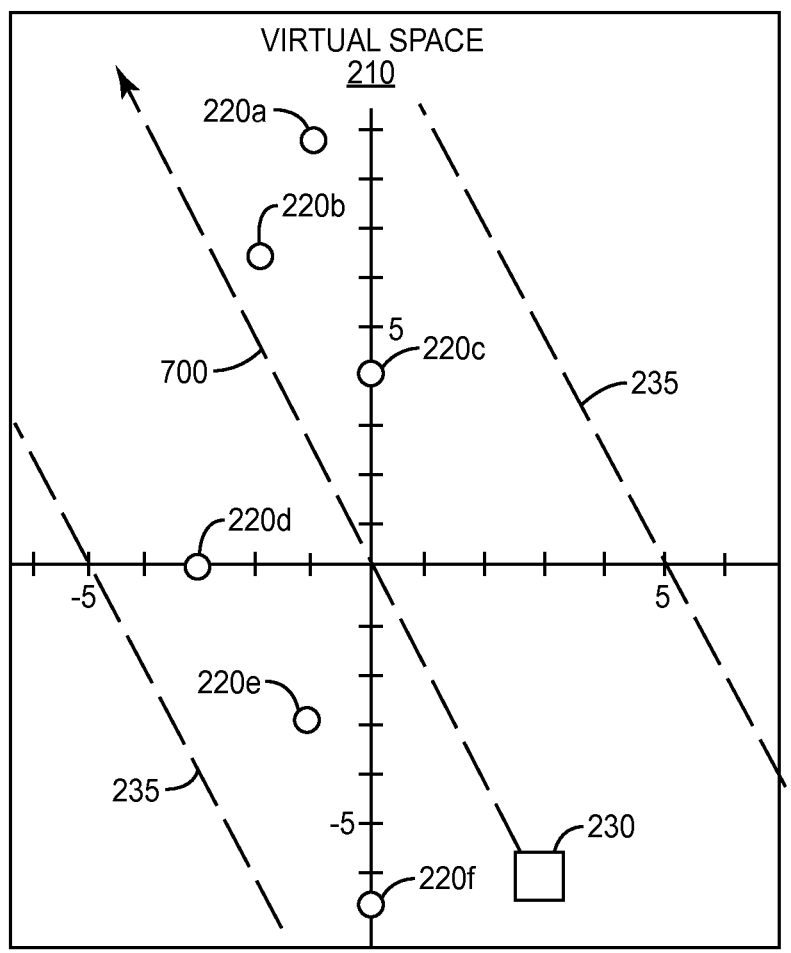
FIG. 7 illustrates repositioning a virtual listener through a virtual space according to a configured path, according to various embodiments of the present disclosure.

For example, FIG. 7 illustrates the virtual space 210 in which visual elements 215a-f are respectively mapped to coordinates 220a-f, just as in the example of FIG. 2A. However, in the example of FIG. 7, the virtual listener 230 is repositioned relative to the coordinates 220a-f according to a configured path 700 through the virtual space 210. The threshold distance 235 moves along with the virtual listener 230, such that each of the coordinates 220a-f is within the threshold distance 235 at some point as the virtual listener 230 is repositioned along the configured path 700. As the virtual listener 230 moves closer to certain coordinates 220 and away from others, the amplitudes used to generate corresponding sound components also change, which further cause the composite sounds 320 and macro-composite sounds 325 generated to change.

Although the configured path 700 depicted in FIG. 7 is a continuously linear path, the configured path 700 may bend, loop, or be discontinuous, according to various embodiments. For example, the configured path 700 may be configured to weave through the virtual space in order to ensure that the various coordinates 220 are visited in a particular order. Further, various embodiments of the configured path 700 may vary the speed at which the virtual listener 230 travels, or even stop the virtual listener 230 at a particular spot along the configured path 700 for a particular duration. Various embodiments of the configured path 700 may leap from waypoint to waypoint, pausing at each waypoint for a discrete time before moving to the next. Other configurations of the configured path 700 are possible, according to various embodiments, including one or more combinations of the above. Further, the configured path 700 may be generated by the sound generation device 110, or may be configured according to a command received from a remote device (e.g., UI client 115) and/or user. It should also be noted that, although the example of FIG. 7 illustrates an example of the virtual listener 235 moving according to a configured path 700, the distance between the virtual listener 235 and one or more of the coordinates 220 may also be modified by updating the positioning of the coordinates 220 within the virtual space 210, e.g., in response to an update from a UI client 115 and/or user.

Figure 8:
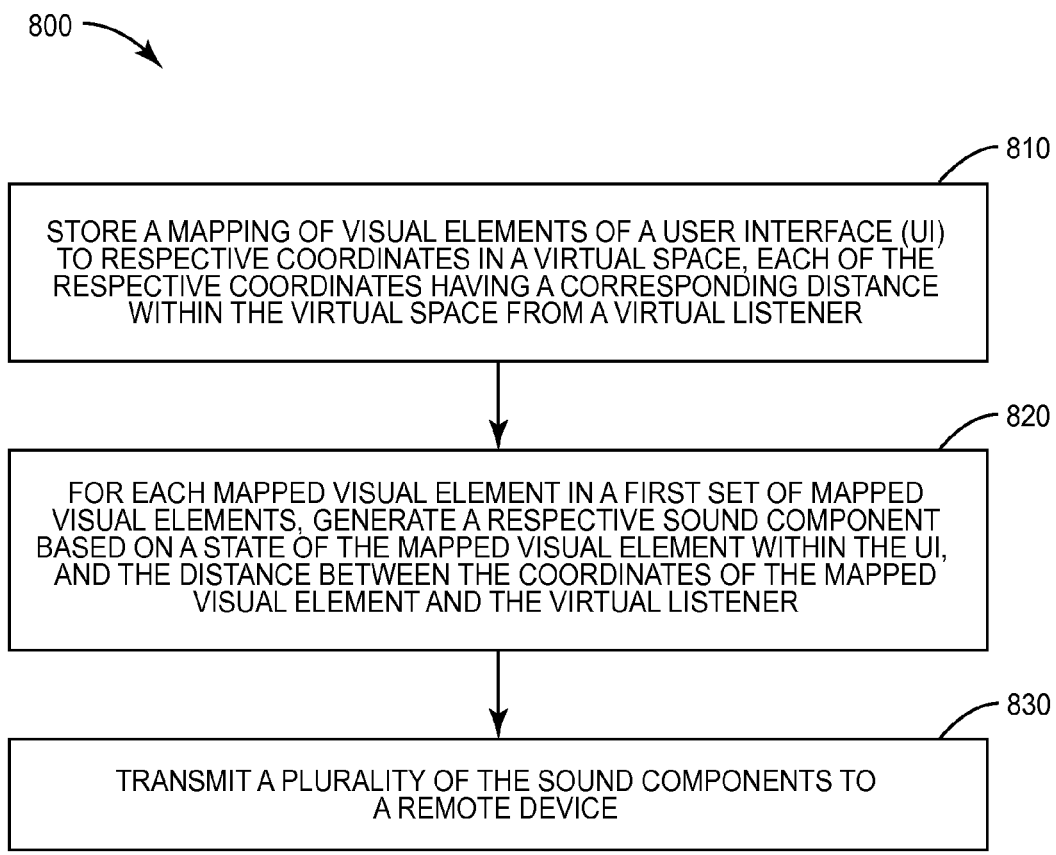
FIG. 8 is a flowchart illustrating an example computer-implemented method of generating sound components, according to various embodiments of the present disclosure.

In view of the above, an example computer-implemented method 800 is illustrated in FIG. 8. The example method 800 comprises storing a mapping of visual elements 215a-f of a user interface 205a to respective coordinates 220a-f in a virtual space 210, each of the respective coordinates 220a-f having a corresponding distance 310 within the virtual space 210 from a virtual listener 230 (step 810). The method 800 further comprises, for each mapped visual element 215a-f in a first set of mapped visual elements 215c-e, generating a respective sound component 315a-c based on a state 305a-c of the mapped visual element 215c-e within the UI 205a, and the distance 310a-c between the coordinates 220c-e of the mapped visual element 215c-e and the virtual listener 230 (step 820). The method 800 further comprises transmitting a plurality of the sound components 315a-c to a remote device 115, 120, 130 (step 830).

Figure 9:
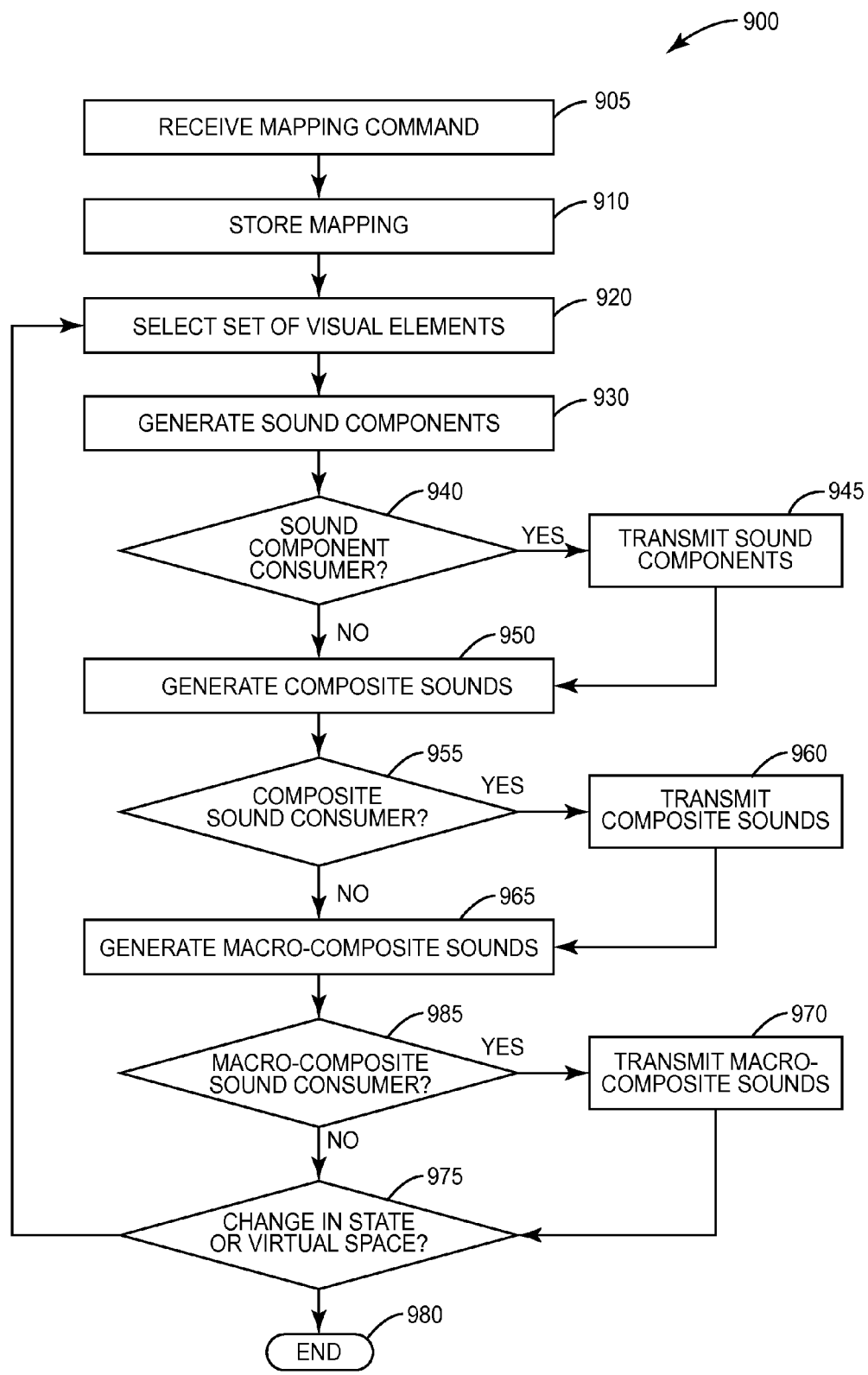
FIG. 9 is a flowchart illustrating a more detailed computer-implemented example method of generating sound components, according to various embodiments of the present disclosure.

A more detailed example method 900, implemented by a sound generation device 110 (and in view of the above) is illustrated in FIG. 9. According to the method 900, the sound generation device 110 receives a command to map visual elements 215 of a first and second UI 205 to respective coordinates in a virtual space 210 (step 905). In response, the sound generation device 110 stores a mapping of the visual elements 215 in accordance with the received command (step 910). The sound generation device 110 then identifies a set of the mapped visual elements 215 (step 920) (e.g., the mapped visual elements 215 that are mapped to coordinates 220 within a threshold distance 235 of a virtual listener 230), and generates respective sound components 315 for each mapped visual element 215 in the set based on a state 305 of the mapped visual element 215 and the distance 310 between the coordinates 220 of the mapped visual element 215 and the virtual listener 230 (step 930). If one or more consumers (e.g., a UI client 115, a sound compositor 120, an output device 130) for the sound components 315 exist on the network 105 (step 940), the sound generation device 110 transmits the sound components 315 to those consumers (step 945).

For example, consumers such as one or more UI clients 115, sound compositors 120, and/or output devices 130 may have each registered with the sound generation device 110 for generated sound components 315. In response, the sound generation device 110 transmits the generated sound components 315 to the registered consumers once the sound components 315 are generated. The registered consumers may then integrate those sound components into composite sounds and/or may output them so that a user may hear an audible representation of the UI 205, for example.

The sound generation device 110 then generates composite sounds 320 by integrating sound components 315 selected from the generated sound components 315 (step 950). If one or more consumers for the composite sounds 320 (step 955) exists on the network 105, the sound generation device 110 will transmit the sound components 315 to those consumers in the form of the generated composite sounds 320 (step 960).

The sound generation device 110 then generates a macro-composite sound 325 by integrating a composite sound 320 and one or more other composite sounds 320 and/or one or more sound components 315 (step 965). If one or more consumers for the macro-composite sound 320 (step 985) exists on the network 105, the sound generation device 110 will transmit the sound components 315 to those consumers in the form of the generated macro-composite sound 325 (step 970).

If a modification to the virtual space 110 (e.g., due to a repositioning of the virtual listener 230 and/or coordinates mapped to a visual element 215, as described above) or a state 305 of a mapped visual element 215 occurs (e.g., due to the first and/or second UI 205 being updated) (step 975), the sound generation device 110 again selects a set of mapped visual elements (step 920) and proceeds according to the method 900 as previously described (e.g., generating sound components for mapped visual elements 215 based on the modified state(s) 305 and/or modified distance(s) 310). If no such modification occurs (step 975), the method 900 ends (step 980).

As the method 900 is performed, one or more of the consumers of the sound components 315, composite sounds 320, and/or macro-composite sound 325 may change over time, particularly if the virtual listener 230 is configured to move indefinitely along a looping configured path 700, and/or if the states 305 of the UI 205 change over long periods of time, for example. Thus, while there may initially be a consumer for the macro-composite sound 325, that consumer may, e.g., disconnect, unsubscribe, or leave the system 100. Thus, various embodiments check whether there is a consumer for the macro-composite sound 325 before generating it, and if not, will omit generating and transmitting the macro-composite sound 325. Thus, various embodiments may determine whether there is a need for further sound generating and transmitting steps based on the consumers that are subscribed to the sound generating services of the sound generating device 110, and modify the extent to which a sound generating workflow 300 is traversed accordingly.

Figure 10:
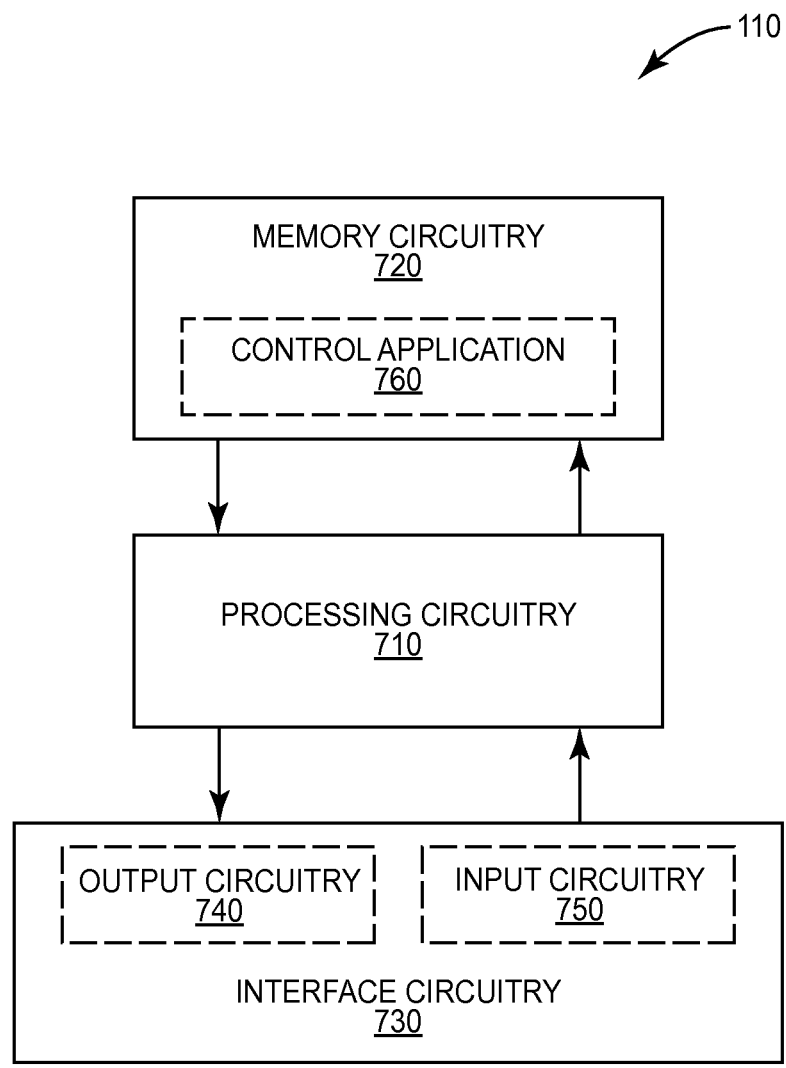
FIG. 10 is a block diagram illustrating example hardware of a sound generation device, according to various embodiments of the present disclosure.

The sound generating device 110 may be implemented according to the example hardware illustrated in FIG. 10. The example hardware of FIG. 10 comprises processing circuitry 710, memory circuitry 720, and interface circuitry 730. The processing circuitry 710 is communicatively coupled to the memory circuitry 720 and the interface circuitry 730, e.g., via one or more buses. The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing machine instructions stored as a machine-readable computer program 760 in the memory circuitry 720. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the computing device 110. Such I/O data paths may include data paths for exchanging signals over a communications network 105 and data paths for exchanging signals with a user. For example, the interface circuitry 730 may comprise a transceiver configured to send and receive communication signals over one or more of a cellular network, Ethernet network, or optical network. The interface circuitry 730 may also comprise one or more of a graphics adapter, display port, video bus, touchscreen, graphical processing unit (GPU), display port, Liquid Crystal Display (LCD), and Light Emitting Diode (LED) display, for presenting visual information to a user. The interface circuitry 730 may also comprise one or more of a pointing device (e.g., a mouse, stylus, touchpad, trackball, pointing stick, joystick), touchscreen, microphone for speech input, optical sensor for optical recognition of gestures, and keyboard for text entry.

The interface circuitry 730 may also comprise input circuitry 750 and output circuitry 740. For example, the output circuitry 740 may comprise transmitter circuitry configured to send communication signals over the communications network 105, whereas the input circuitry 750 may comprise receiver circuitry configured to receive communication signals over the communications network 105. Thus, the interface circuitry 730 may be implemented as a unitary physical component, or as a plurality of physical components that may be contiguously or separately arranged, any of which may be communicatively coupled to any other, or may communicate with any other via the processing circuitry 710. Similarly, the output circuitry 740 may comprise a display, whereas the input circuitry 750 may comprise a keyboard. Other examples, permutations, and arrangements of the above and their equivalents will be readily apparent to those of ordinary skill.

The processing circuitry 710 may be configured to store, in the memory circuitry 720, a mapping of visual elements 215 of a user interface (UI) to respective coordinates 220 in a virtual space 210, each of the respective coordinates 220 having a corresponding distance 310 within the virtual space 210 from a virtual listener 230. The processing circuitry 710 may further be configured to, for each mapped visual element 215 in a first set of mapped visual elements 215, generate a respective sound component 315 based on a state 305 of the mapped visual element 215 within the UI 205, and the distance 310 between the coordinates 220 of the mapped visual element 215 and the virtual listener 230. The processing circuitry 720 may further be configured to transmit a plurality of the sound components 315 to a remote device 115, 120, 130 via the interface circuitry 730.

The present invention may, of course, be carried out in other ways than those specifically set forth herein without departing from essential characteristics of the invention. The present embodiments are to be considered in all respects as illustrative and not restrictive.

What is claimed is:

1. A computer-implemented method comprising:
   storing a mapping of visual elements of a user interface (UI) to respective coordinates in a virtual space, each of the respective coordinates having a corresponding distance within the virtual space from a virtual listener;
   for each mapped visual element in a first set of mapped visual elements, generating a respective sound component based on:
      a state of the mapped visual element within the UI; and
      the distance between the coordinates of the mapped visual element and the virtual listener;
   transmitting a plurality of the sound components to a first remote device;
   wherein storing the mapping is in response to:
      receiving a command from a fifth remote device, the command comprising respective positions of the visual elements within the UI, and a user-designated position within the UI;
      generating the mapping by associating each of the visual elements with the respective coordinates in the virtual space according to the respective positions of the visual elements within the UI;
      positioning the virtual listener within the virtual space according to the user-designated position relative to the respective positions of the visual elements within the UI.

2. The computer-implemented method of claim 1, wherein transmitting the plurality of the sound components to the first remote device comprises transmitting the plurality of the sound components to a sound compositor executing on the first remote device for production of a composite sound of the UI.

3. The computer-implemented method of claim 2, further comprising transmitting the plurality of the sound components to a further sound compositor executing on a second remote device, distinct from the first remote device, for production of a different composite sound of the UI.

4. The computer-implemented method of claim 1, further comprising:
   generating a composite sound of the UI by integrating at least two sound components selected from the plurality of the sound components;
   wherein the plurality of the sound components are transmitted to the first remote device as the composite sound.

5. The computer-implemented method of claim 1, further comprising:
   generating a first and second composite sound by integrating, for each of the first and second composite sound, at least two sound components selected from the plurality of the sound components;
   generating a macro-composite sound of the UI by integrating the first and second composite sounds;
   wherein the plurality of the sound components are transmitted to the first remote device as the macro-composite sound.

6. The computer-implemented method of claim 1, further comprising:
   modifying, for at least one mapped visual element, the distance between the coordinates of the at least one mapped visual element and the virtual listener;
   responsive to the modifying and for each mapped visual element in a second set of mapped visual elements, generating a respective subsequent sound component based on:
      the state of the mapped visual element within the UI; and the distance between the coordinates of the mapped visual element and the virtual listener;

transmitting a plurality of the subsequent sound components to the first remote device.

7. The computer-implemented method of claim 6, further comprising:

generating a composite sound of the UI by integrating at least two sound components selected from the plurality of the subsequent sound components;

wherein the plurality of the subsequent sound components are transmitted to the first remote device as the composite sound.

8. The computer-implemented method of claim 6, wherein the modifying of the distance between the coordinates of the at least one mapped visual element and the virtual listener comprises repositioning the virtual listener relative to the coordinates of at least one mapped visual element according to a configured path through the virtual space.

9. The computer-implemented method of claim 8, wherein the configured path through the virtual space is configured according to a command received from a third remote device.

10. The computer-implemented method of claim 1, further comprising:

detecting a modification to a state of a mapped visual element within the UI;

responsive to the detecting and for each mapped visual element in a third set of mapped visual elements, generating a respective subsequent sound component based on:

the state of the mapped visual element within the UI; and the distance between the coordinates of the mapped visual element and the virtual listener transmitting a plurality of the subsequent sound components to the first remote device.

11. The computer-implemented method of claim 1, wherein generating the respective sound component for each mapped visual element in the first set of mapped visual elements is further based on a repeat interval, amplitude, waveform shape, and waveform duration associated with the mapped visual element.

12. The computer-implemented method of claim 1, further comprising identifying the first set of mapped visual elements by selecting visual elements that are mapped to coordinates within a threshold distance of the virtual listener.

13. The computer-implemented method of claim 1, wherein storing the mapping is in response to receiving a command from a fourth remote device, the command associating at least one of the visual elements of the UI with the respective coordinates in the virtual space.

14. The computer-implemented method of claim 1, further comprising storing a mapping of visual elements of a further UI to respective coordinates in the virtual space.

15. A sound generation device comprising:

memory circuitry configured to store data;

interface circuitry configured to exchange signals over a network;

processing circuitry communicatively coupled to the interface circuitry and memory circuitry, the processing circuitry configured to:

store, in the memory circuitry, a mapping of visual elements of a user interface (UI) to respective coordinates in a virtual space, each of the respective coordinates having a corresponding distance within the virtual space from a virtual listener;

for each mapped visual element in a first set of mapped visual elements, generate a respective sound component based on:

a state of the mapped visual element within the UI; and the distance between the coordinates of the mapped visual element and the virtual listener;

transmit a plurality of the sound components to a first remote device via the interface circuitry;

wherein the processing circuitry is further configured to store the mapping in the memory circuitry in response to:

receiving a command from a fifth remote device via the interface circuitry, the command comprising respective positions of the visual elements within the UI, and a user-designated position within the UI;

generating the mapping by associating each of the visual elements with the respective coordinates in the virtual space according to the respective positions of the visual elements within the UI;

positioning the virtual listener within the virtual space according to the user-designated position relative to the respective positions of the visual elements within the UI.

16. The sound generation device of claim 15, wherein to transmit the plurality of the sound components to the first remote device, the processing circuitry is configured to transmit the plurality of the sound components to a sound compositor executing on the first remote device for production of a composite sound of the UI.

17. The sound generation device of claim 16, wherein the processing circuitry is further configured to transmit the plurality of the sound components via the interface circuitry to a further sound compositor executing on a second remote device, distinct from the first remote device, for production of a different composite sound of the UI.

18. The sound generation device of claim 15, wherein the processing circuitry is further configured to:

generate a composite sound of the UI by integrating at least two sound components selected from the plurality of the sound components;

wherein the plurality of the sound components are transmitted by the processing circuitry via the interface circuitry to the first remote device as the composite sound.

19. The sound generation device of claim 15, wherein the processing circuitry is further configured to:

generate a first and second composite sound by integrating, for each of the first and second composite sound, at least two sound components selected from the plurality of the sound components;

generate a macro-composite sound of the UI by integrating the first and second composite sounds;

wherein the plurality of the sound components are transmitted by the processing circuitry via the interface circuitry to the first remote device as the macro-composite sound.

20. The sound generation device of claim 15, wherein the processing circuitry is further configured to:

modify, for at least one mapped visual element, the distance between the coordinates of the at least one mapped visual element and the virtual listener;

responsive to the modifying and for each mapped visual element in a second set of mapped visual elements, generate a respective subsequent sound component based on:
   the state of the mapped visual element within the UI; and
   the distance between the coordinates of the mapped visual element and the virtual listener;
transmit a plurality of the subsequent sound components to the first remote device via the interface circuitry.

21. The sound generation device of claim 20, wherein the processing circuitry is further configured to:
generate a composite sound of the UI by integrating at least two sound components selected from the plurality of the subsequent sound components;
wherein the plurality of the subsequent sound components are transmitted by the processing circuitry via the interface circuitry to the first remote device as the composite sound.

22. The sound generation device of claim 20, wherein to modify the distance between the coordinates of the at least one mapped visual element and the virtual listener, the processing circuitry is configured to reposition the virtual listener relative to the coordinates of at least one mapped visual element according to a configured path through the virtual space.

23. The sound generation device of claim 22, wherein the configured path through the virtual space is configured by the processing circuitry according to a command received from a third remote device via the interface circuitry.

24. The sound generation device of claim 15, wherein the processing circuitry is further configured to:
detect a modification to a state of a mapped visual element within the UI;
responsive to the detecting and for each mapped visual element in a third set of mapped visual elements, generate a respective subsequent sound component based on:
   the state of the mapped visual element within the UI; and
   the distance between the coordinates of the mapped visual element and the virtual listener
transmit a plurality of the subsequent sound components to the first remote device via the interface circuitry.

25. The sound generation device of claim 15, wherein the processing circuitry is configured to generate the respective sound component for each mapped visual element in the first set of mapped visual elements further based on a repeat interval, amplitude, waveform shape, and waveform duration associated with the mapped visual element.

26. The sound generation device of claim 15, wherein the processing circuitry is further configured to identify the first set of mapped visual elements by selecting visual elements that are mapped to coordinates within a threshold distance of the virtual listener.

27. The sound generation device of claim 15, wherein the processing circuitry is configured to store the mapping in response to receiving a command from a fourth remote device via the interface circuitry, the command associating at least one of the visual elements of the UI with the respective coordinates in the virtual space.

28. The sound generation device of claim 15, wherein the processing circuitry is further configured to store a mapping of visual elements of a further UI to respective coordinates in the virtual space.

29. A non-transitory computer readable medium storing software instructions that, when executed by a programmable sound generation device, cause the programmable sound generation device to:
store a mapping of visual elements of a user interface (UI) to respective coordinates in a virtual space, each of the respective coordinates having a corresponding distance within the virtual space from a virtual listener;
for each mapped visual element in a first set of mapped visual elements, generate a respective sound component based on:
   a state of the mapped visual element within the UI; and
   the distance between the coordinates of the mapped visual element and the virtual listener;
transmit a plurality of the sound components to a first remote device;
wherein the software instructions cause the programmable sound generation device to store the mapping in response to the programmable sound generation device:
   receiving a command from a fifth remote device, the command comprising respective positions of the visual elements within the UI, and a user-designated position within the UI;
   generating the mapping by associating each of the visual elements with the respective coordinates in the virtual space according to the respective positions of the visual elements within the UI;
   positioning the virtual listener within the virtual space according to the user-designated position relative to the respective positions of the visual elements within the UI.

* * * * *